(12) United States Patent
Tsao et al.

(10) Patent No.: US 11,736,498 B1
(45) Date of Patent: Aug. 22, 2023

(54) STATEFUL DETECTION OF CYBERATTACKS

(71) Applicant: Trend Micro Incorporated, Tokyo (JP)

(72) Inventors: Wen-Kwang Tsao, Taipei (TW); Mun-Hou Wong, Taipei (TW); Annie Bu, Taipei (TW); Chia-Yen Chang, Taipei (TW); Jonathan James Oliver, Melbourne (AU); Liam Huang, Taipei (TW); Allen Lai, Taipei (TW); Chien-Yi Chiu, Taipei (TW); Ping-Huan Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 552 days.

(21) Appl. No.: 16/774,358

(22) Filed: Jan. 28, 2020

Related U.S. Application Data (60) Provisional application No. 62/893,354, filed on Aug. 29, 2019.

(51) Int. Cl.
| | |
|---|---|
| *H04L 29/06* | (2006.01) |
| *H04L 9/40* | (2022.01) |
| *G06N 5/04* | (2023.01) |
| *G06F 16/2458* | (2019.01) |
| *G06F 16/242* | (2019.01) |

(52) U.S. Cl.
CPC ........ *H04L 63/1416* (2013.01); *G06F 16/2425* (2019.01); *G06F 16/2471* (2019.01); *G06N 5/04* (2013.01)

(58) Field of Classification Search
CPC ..... G06F 16/2477; G06F 21/52; G06F 21/552; G06F 21/577; G06Q 50/01; H04L 63/1425; H04L 63/1433; H04L 43/08; H04L 63/1441; G06F 11/3452; H04L 63/308; H04L 63/1408; H04L 63/1416; H04L 63/1458
See application file for complete search history.

(56) References Cited

U.S. PATENT DOCUMENTS

| | | | |
|---|---|---|---|
| 6,202,158 B1 | 3/2001 | Urano et al. | |
| 8,069,372 B2 | 11/2011 | Natvig | |
| 8,515,881 B2* | 8/2013 | Schwoegler et al. | H04L 63/308 706/12 |
| 9,111,088 B2 | 8/2015 | Ghai et al. | |
| 9,185,095 B1 | 11/2015 | Moritz et al. | |
| 9,336,385 B1* | 5/2016 | Spencer et al. | ........ G06F 21/52 |
| 9,584,541 B1* | 2/2017 | Weinstein et al. | . H04L 63/1441 |

(Continued)

OTHER PUBLICATIONS

Advanced persistent threat - Wikipedia, the free encyclopedia, 4 sheets [retrieved on Jul. 17, 2013], from the internet: http://en.wikipedia.org/wiki//Advanced_persistent_threat.

APT17, Deputy Dog | Mitre Att&ck, 3 sheets [retrieved on Jan. 21, 2020], from the internet: https://attack.mitre.org/groups/G0025/.

java.security Class AllPermission (Java 2 Platform SE v1.4.2), 5 sheets [retrieved on Jan. 6, 2012], from the internet: http://docs.oracle.com/javase/1.4.2/docs/api/java/security/ALLPermission.html.

(Continued)

*Primary Examiner* — Dustin Nguyen
(74) *Attorney, Agent, or Firm* — Beyer Law Group LLP (57) ABSTRACT

A system for stateful detection of cyberattacks includes an endpoint computer and a backend computer system. The endpoint computer monitors for cyberattacks and sends out queries for detected security events. The backend computer system stores observation data that are included in the queries. The backend computer system combines current observation data from a current query, relevant observation data from previous queries, and relevant cybersecurity data. The combined data are evaluated for cyberattacks.

20 Claims, 4 Drawing Sheets

(56) References Cited

U.S. PATENT DOCUMENTS

| | | | |
|---|---|---|---|
| 10,320,814 B2 | 6/2019 | Chiu et al. | |
| 10,454,963 B1* | 10/2019 | Smith ................. | G06F 16/2477 |
| 10,673,880 B1* | 6/2020 | Pratt et al. ......... | H04L 63/1433 |
| 10,681,071 B1* | 6/2020 | Pendergast et al. | H04L 63/1458 |
| 2004/0044912 A1 | 3/2004 | Connary et al. | |
| 2006/0064598 A1 | 3/2006 | Higashikado et al. | |
| 2007/0039049 A1 | 2/2007 | Kupferman et al. | |
| 2007/0118350 A1 | 5/2007 | van der Made | |
| 2011/0238855 A1 | 9/2011 | Korsunsky et al. | |
| 2013/0117006 A1 | 5/2013 | Varghese et al. | |
| 2013/0117848 A1 | 5/2013 | Golshan et al. | |
| 2013/0312092 A1* | 11/2013 | Parker ............... | H04L 63/1408 726/22 |
| 2014/0298461 A1 | 10/2014 | Hohndel et al. | |
| 2015/0033227 A1 | 1/2015 | Lin et al. | |
| 2015/0205691 A1* | 7/2015 | Seto .................. | G06F 11/3452 702/182 |
| 2016/0162690 A1* | 6/2016 | Reith et al. .......... | G06F 21/577 726/25 |
| 2017/0063905 A1* | 3/2017 | Muddu et al. ..... | H04L 63/1425 |
| 2017/0201530 A1* | 7/2017 | Mead et al. ....... | H04L 63/1416 |
| 2017/0272469 A1* | 9/2017 | Kraemer et al. ..... | G06F 21/552 |
| 2017/0346839 A1* | 11/2017 | Peppe et al. ......... | G06F 21/552 |
| 2018/0063177 A1* | 3/2018 | Yamada et al. .... | H04L 63/1416 |
| 2018/0152471 A1* | 5/2018 | Jakobsson ............. | G06Q 50/01 |
| 2018/0367553 A1* | 12/2018 | Hayden et al. .... | H04L 63/1425 |
| 2021/0168042 A1* | 6/2021 | Mijumbi et al. ....... | H04L 43/08 |

OTHER PUBLICATIONS

Cisco NAC Appliance - Wikipedia, the free encyclopedia, 5 sheets [retrieved on Jun. 3, 2009], from the internet: http://en.wikipedia.org/wiki/Clean_Access_Agent.

Cisco Systems - Cisco Network Admission Control (NAC), 2 sheets, webpage [online][retrieved on Jun. 3, 2009], from the internet: http://www.cisco.com/en/US/netsol/ns466/networking_solutions_package.html.

Dok, Deputy Dog | Mitre Att&ck, 12 sheets [retrieved on Jan. 21, 2020], from the internet: https://attack.mitre.org/software/S0281/.

Interlop Labs What is Cisco NAC?, 2 sheets, [retrieved on Jun. 3, 2009], from the internet: http://www.interop.com/archive/pdfs/2007-06WhatIsCiscoNAC.pdf.

Introduction to Virtual Machine Migration, 2 sheets [retrieved on Jun. 3, 2009], from the internet: http://docs.hp.com/en/T2767-90067/ch10s01.html.

Java virtual machine - Wikipedia, the free encyclopedia, 8 sheets [retrieved on Jan. 6, 2012], from the internet: http://en.wikipedia.org/wiki/Java_virtual_machine.

Just Released: Att&ck for Industrial Control Systems, Mitre Att&ck, 4 sheets [retrieved on Jan. 21, 2020], from the internet: https://attack.mitre.org/.

Koichi Onoue, et al. "A Virtual Machine Migration System Based on a CPU Emulator", 2006, pages 1-8, IEEE 2nd International Workshop on Virtualization Technology in Distributed Computing (VTDC 2006).

Microsoft About NAP (Windows), 1 sheet, webpage [online] [retrieved on Jun. 3, 2009], from the internet: http://msdn.microsoft.com/en-us/library/aa369143(VS.85).aspx.

Qin Li, et al. "HyperMIP: Hypervisor controlled Mobile IP for Virtual Machine Live Migration across Networks", 2008, pages 80-88, 11th IEEE High Assurance Systems Engineering Symposium.

Sandboxie - Sandbox software for application isolation and secure Web browsing, 3 sheets [retrieved on Jul. 17, 2013], from the internet: http://www.sandboxie.com/.

Sandboxie - Wikipedia, the free encyclopedia, 2 sheets [retrieved on Jul. 2, 2013], from the internet: http://en.wikipedia.org/wiki/Sandboxie.

VMware VMotion Live migration of virtual machines without service interuption, 2 sheets, webpage [online][retrieved on Jun. 3, 2009], from the internet: http://www.vmware.com/files/pdf/vmotion_datasheet.pdf.

VMware VSphere Live migration of virtual machines, 2 sheets, webpage [online][retrieved on Jun. 3, 2009], from the internet: http://www.vmware.com/products/vi/vc/vmotion.html.

What is advanced persistent threat (APT)? - definition from WhatIs.com, 4 sheets [retrieved on Oct. 19, 2017], from the internet: http://searchsecurity.techntarget.com/definition/advance-persistent-threat-APT.

* cited by examiner

STATEFUL DETECTION OF CYBERATTACKS

CROSS-REFERENCE TO RELATED APPLICATION

This application claims the benefit of U.S. Provisional Application No. 62/893,354, filed on Aug. 29, 2019, which is incorporated herein by reference in its entirety.

BACKGROUND OF THE INVENTION

1. Field of the Invention

The present invention relates generally to cybersecurity, and more particularly but not exclusively to detection of cyberattacks.

2. Description of the Background Art

A cyberattack is a malicious action against a computer or computer network. Examples of cyberattacks include distributed denial of service (DDoS) attacks, unauthorized intrusion, phishing, malware distribution, etc. An advanced persistent threat (APT) is a cyberattack that is perpetrated in several stages. An APT attack is relatively difficult to detect because each stage of the attack is not necessarily malicious. An APT attack is typically tailored to a particular target, allowing the APT attack to circumvent conventional, individual cyberattack detectors.

SUMMARY

In one embodiment, a system for stateful detection of cyberattacks includes an endpoint computer and a backend computer system. The endpoint computer monitors for cyberattacks and sends out queries for detected security events. The backend computer system stores observation data that are included in the queries. The backend computer system combines current observation data from a current query, relevant observation data from previous queries, and relevant cybersecurity data. The combined data are evaluated for cyberattacks.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
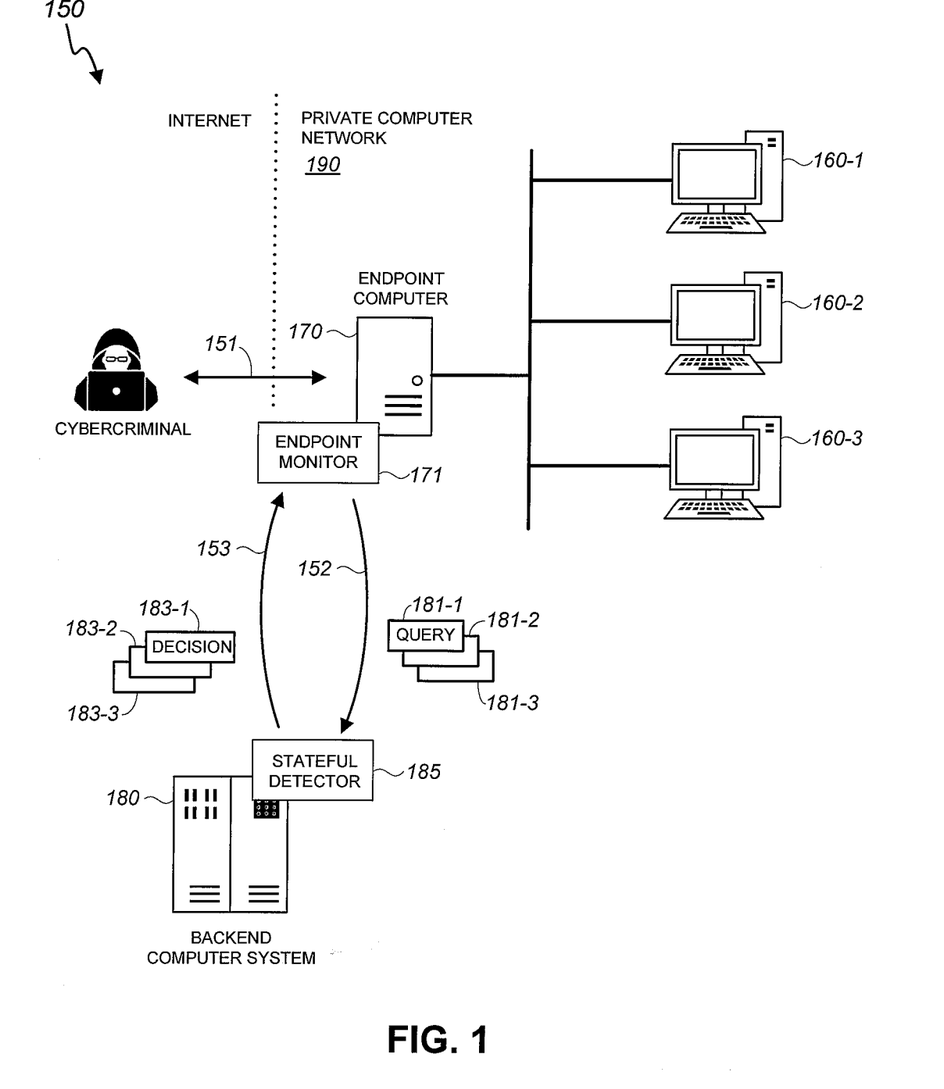
FIG. 1 shows a logical diagram of a system for detecting cyberattacks in accordance with an embodiment of the present invention.

FIG. 1 shows a logical diagram of a system 150 for detecting cyberattacks in accordance with an embodiment of the present invention. In the example of FIG. 1, the system 150 comprises an endpoint computer 170 and a backend computer system 180.

The endpoint computer 170 may be a personal computer, server computer, security appliance, or other computing device that works in conjunction with the backend computer system 180 to detect cyberattacks. In the example of FIG. 1, the endpoint computer 170 is part of a private computer network 190 that includes a plurality of computers 160 (i.e., 160-1, 160-2, 160-3,...). The endpoint computer 170 may include an endpoint monitor 171 that is configured to detect security events, such as reception of spam emails, reception of executable files, presence of suspicious network traffic, access to particular computers on the private computer network 190, or other events that may compromise the security of the endpoint computer 170 and/or the private computer network 190 in general. The endpoint monitor 171 may be implemented in software, i.e., instructions that are executed by the processor of the endpoint computer 170.

In the example of FIG. 1, a cybercriminal may initiate an attack on the private computer network 190 over the Internet. The cyberattack may target the endpoint computer 170 or a computer 160. The cyberattack includes a plurality of actions (see arrow 151) that the endpoint computer 170 detects as security events. The actions of the cyberattack may include continuous, iterative attempts to perform the cyberattack, such as sending different spam emails, trying different passwords, using different Internet Protocol (IP) addresses or domain names to communicate with computers on the private computer network 190, etc. Each of these attempts, independently, may or may not be malicious. That is, these attempts may not be significant enough to attract attention of the network administrator. However, these attempts, collectively, may allow the cybercriminal to find and exploit a security weakness of the endpoint computer 170 and/or the private computer network 190 in general.

The endpoint monitor 171 may be configured to generate a query 181 (i.e., 181-1, 181-2, 181-3,...) for each detected security event. In the example of FIG. 1, a query 181-1 may correspond to a first security event detected by the endpoint monitor 171, a query 181-2 may correspond to a second security event detected by the endpoint monitor 171, etc.

A query 181 may include observation data of the detected security event. For example, for a security event involving reception of an executable file, the observation data may include timestamp (e.g., time and date) of the reception, a network address (e.g., IP address or domain name) from which the executable file was received, a hash of the executable file, the name of the executable file, and other data relating to the executable file. As another example, for a security event involving an unauthorized access to the private computer 190, the observation data of the detected security event may include timestamp of the access, the network address of the computer making the access, and other data relating to the access. As can be appreciated, the observation data depend on particulars of the security event.

The backend computer system 180 may comprise one or more server computers, a cloud computing infrastructure, or other computing system that works in conjunction with the endpoint monitor 171 to detect cyberattacks. The backend computer system 180 may be deployed in the private computer network 190 or be accessible in-the-cloud, i.e., over the Internet.

The backend computer system 180 may include a stateful detector 185 that is configured to receive a plurality of queries 181 from the endpoint monitor 171 and selectively store observation data that are included in the plurality of queries 181. The stateful detector 185 may be configured to combine observation data from a current query, observation data from previously received queries, and cybersecurity data in general. The stateful detector 185 may be configured to evaluate the combined data for cyberattacks.

More particularly, the stateful detector 185 detects a cyberattack not just from current observation data, but also from other data including previously received observation data. Advantageously, the stateful detector 185 gathers a more complete picture of a cyberattack for evaluation. The stateful detector 185 may be implemented in software hosted by the backend computer system 180.

The stateful detector 185 may receive the plurality of queries 181 (see arrow 152) over a computer network, which in the example of FIG. 1 is over the Internet. The stateful detector 185 may, for each query 181, output (see arrow 153) a corresponding decision 183 (i.e., 183-1, 183-2, 183-3,...). A decision 183 indicates a decision that is responsive to a corresponding query 181. A decision 183 may indicate raising an alert (e.g., email or text message an administrator), putting an object (e.g., executable file, email) in quarantine, suspending a computer operation, that an object is benign, that an object is risky, etc. For initial attempts of a cyberattack, the corresponding first few decisions 183 may not indicate anything suspicious about the initial attempts. However, as more attempts are made and more observation data are collected, the stateful detector 185 may be able to generate a decision 183 that indicates the true nature of the attempts collectively.

Figure 2:
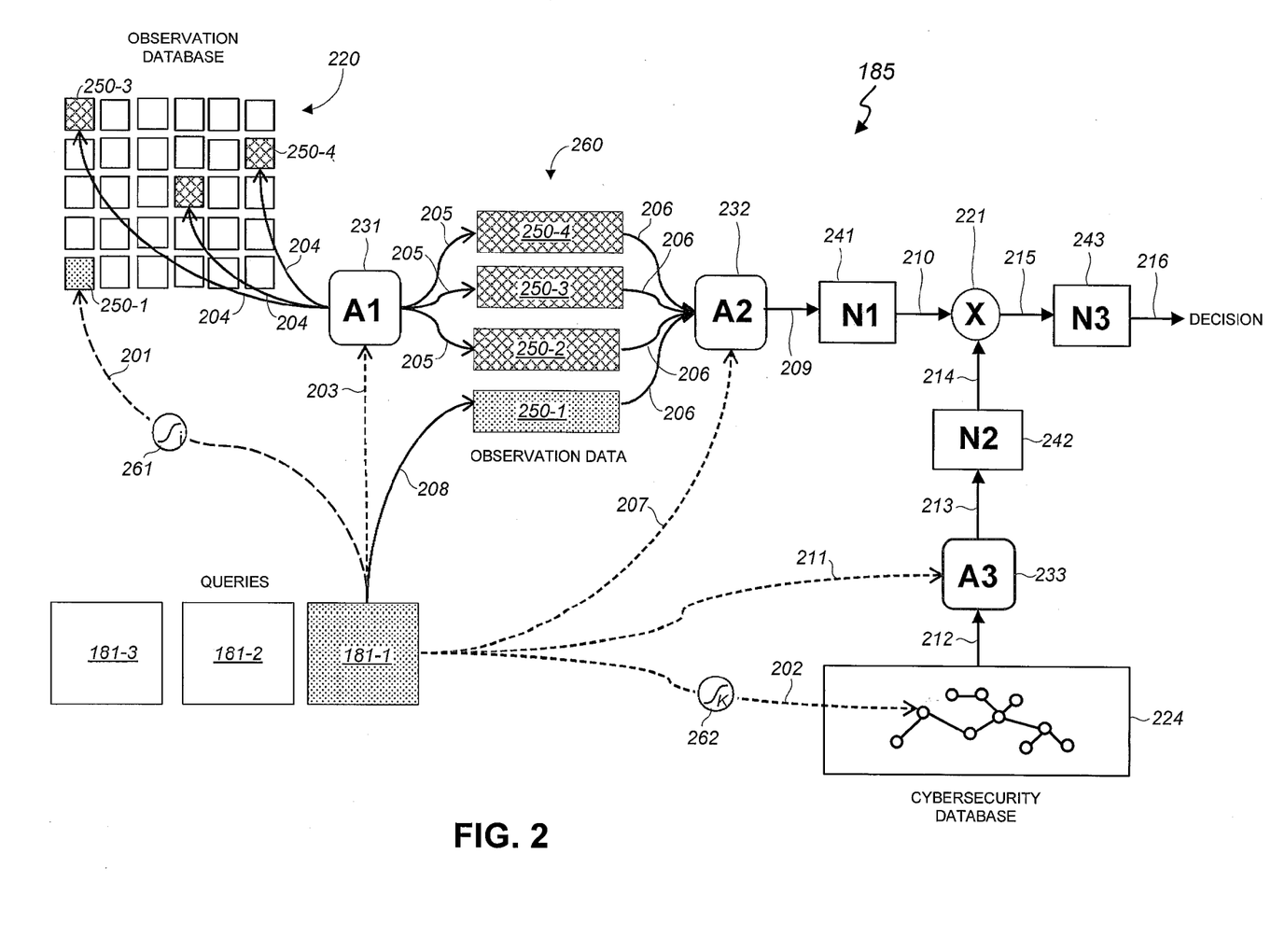
FIG. 2 shows a logical diagram of a stateful detector for detecting cyberattacks in accordance with an embodiment of the present invention.

FIG. 2 shows a logical diagram of the stateful detector 185 in accordance with an embodiment of the present invention. The stateful detector 185 may include an observation database 220, cybersecurity database 224, attention modules 231-233, and a matching network that comprises a preprocessor 241, preprocessor 242, a combiner 221, and a detector 243.

The stateful detector 185 may receive a plurality of queries 181 from the endpoint monitor 171 (see FIG. 1). In the example of FIG. 2, the queries 181-1, 181-2, 181-3, etc. are received in sequence, one after the other, with the query 181-1 being the current (i.e., last received) query and received after the query 181-2, with the query 181-2 being received after the query 181-3, etc. The observation database 220 may comprise a data store of observation data 250 (i.e., 250-1, 250-2, etc.) of received queries 181. Observation data 250 that have been stored in the observation database 220 are also referred to herein as "stored observation data."

A selector 261 may be configured to select particular observation data 250 to be stored in the observation database 220. The selector 261 may be configured to store observation data 250 that satisfy predetermined criteria, such as observation data 250 involving a domain name that has a suspicious or bad reputation, a suspicious executable file, a malicious executable file, spam email, access to a computer that stores confidential information, etc. As a particular example, observation data 250 that match adversary attacks and techniques described in the Mitre ATT&CK™ framework (at "attack.mitre.org") may be selected for storage in the observation database 220.

The selector 261 may also be configured to purge stored observation data 250 from the observation database 220, such as stored observation data 250 that have not been used for a predetermined amount of time. As a particular example, records of observation data 250 that have reached a certain age may be deleted from the observation database 220.

As can be appreciated, observation data may be added or purged depending on the particulars of the cybersecurity application. For example, observation data may be added or purged based on whether doing so increases the information entropy of the observation database 220. More particularly, if the information entropy will be increased when replacing existing observation data with new observation data, the existing observation data may be purged and the new observation data may be added.

Generally speaking, an attention module is configured to identify and assemble stored data that are relevant to a current query 181. In the example of FIG. 2, an attention module 231 is configured to search the observation database 220 for stored observation data 250 that are relevant to a current query 181. In one embodiment, stored observation data 250 are relevant to a query 181 when the stored observation data 250 and observation data 250 included in the query 181 have the same or similar information. For example, for a query 181 with observation data 250 that include a hash of an executable file, the attention module 231 may be configured to search for stored observation data 250 that include the same or similar hash. As another example, for a query 181 with observation data 250 that include a network location (e.g., IP address or domain name), the attention module 231 may be configured to search for stored observation data 250 that include the network location.

The attention module 231 may search the observation database 220 for relevant observation data depending on the type of the observation data. For example, distance-based measurements may be used with observation data that are based on locality-sensitive hashes, correlation coefficient scores may be used with observation data comprising a set of numbers, Kullback-Leibler (KL) Divergence may be used with observation data comprising distributions, etc. Machine learning models, such as neural networks, may also be used to identify relevant observation data.

For example, relevance may be determined based on a probability or score. Given a target file as observation data, the relevance of the target file to other files (other observation data) may be determined based on a probability that the target file is similar to the other files by distance measurement of corresponding locality-sensitive hashes or by machine learning classification, for example.

As another example, relevance may be determined based on threat actor. Given target security data as observation data, the relevance of the target security data to stored observation data may be determined based on whether the stored observation data are associated with a threat actor that is linked to the target security data. As a particular example, if the target security data is an AppleScript™ code, the Mitre ATT&CK™ framework may be consulted to find a threat actor that is known for using AppleScript code™ (e.g., Dok malware) and the techniques used by the threat actor (e.g., at "attack.mitre.org/software/S0281/"). Similarly, the Mitre ATT&CK™ framework may be consulted to find a threat group and techniques associated with the threat group (e.g., at "attack.mitre.org/groups/G0025/"). Observation data associated with techniques employed by a threat actor or group may be deemed to be relevant to the target security data.

An attention module 232 may be configured to assemble a set 260 of observation data 250, which comprise current observation data 250 from a current query 181 and stored observation data 250 that the attention module 231 have determined to be relevant to the current query 181.

The cybersecurity database 224 may comprise a data store of general cybersecurity data. The cybersecurity database 224 may comprise a knowledge graph, for example. Unlike the observation database 220, which serves as a short-term memory of the stateful detector 185, the cybersecurity database 224 may comprise cybersecurity data that are available from a variety of sources. For example, the cybersecurity database 224 may comprise a data store of malware signatures, Common Vulnerabilities and Exposures (CVE) entries, reputations of executable files, reputations of network addresses, Indicators of Compromise (IoC), Indicators of Attack (IoA), etc. The cybersecurity database 224 may be accessed locally or externally by the stateful detector 185.

The selector 262 may be configured to select particular observation data 250 to be stored in the cybersecurity database 224. In one embodiment, the selector 262 is configured to select observation data 250 that have general, i.e., not just to the stateful detector 185, cybersecurity implications, such as observation data 250 that include hash of known malware, spam content, malicious network location, etc. The selector 262 may be configured by cybersecurity researchers as an external feed for receiving cybersecurity-related data for analysis and inclusion in the cybersecurity database 224.

The functionality of the attention module 233 is similar to that of the attention module 231 except that the attention module 233 selects data from the cybersecurity database 224. More particularly, in the example of FIG. 2, the attention module 233 is configured to search the cybersecurity database 224 for stored cybersecurity data that are relevant to current observation data 250 of a current query 181. The attention module 233 may employ the same or similar criteria as the attention module 231 to determine relevance of stored cybersecurity data to a query 181.

As can be appreciated, the attention module 231 searches homogeneous data (observation database 220), whereas the attention module 233 searches different and heterogeneous data (cybersecurity database 224). As a particular example, the observation data 250 of the query 181 may be a file. In that example, the attention module 231 may search the observation database 220 for similar files, whereas the attention module 233 may search the cybersecurity database 224 for similar files, logs or reports involving the same type or similar files, webpages (e.g., that post similar files), emails (e.g., with similar file attachments or from the same originator as the file), etc.

In the example of FIG. 2, the matching network comprises the preprocessor 241, the preprocessor 242, the combiner 221, and the detector 243. The matching network is configured to detect cyberattacks by evaluating observation data and cybersecurity data.

The preprocessor 241 may be configured to preprocess the set 260 of observation data 250, such as to normalize the set 260 of observation data 250 to a predetermined format that is recognized by the detector 243. In one embodiment, the predetermined format comprises an input vector with a plurality of bit positions, with each bit position indicating whether or not a feature is present in any of the observation data 250 of the set 260. More particularly, the preprocessor 241 may be configured to set or reset bit positions in the input vector based on presence of corresponding features in the set 260 of observation data 250.

The functionality of the preprocessor 242 is similar to that of the preprocessor 241, except that the preprocessor 242 preprocesses cybersecurity data that the attention module 233 have deemed to be relevant to current observation data 250 of a current query 181. That is, the preprocessor 242 may be configured to preprocess relevant cybersecurity data from the cybersecurity database 224. In one embodiment, the preprocessor 242 is configured to set or reset bit positions in an input vector based on presence of corresponding features in the relevant cybersecurity data.

The combiner 221 may be configured to combine observation data 250 that have been preprocessed by the preprocessor 241 and cybersecurity data that have been preprocessed by the preprocessor 242 to generate combined data. For example, the combiner 221 may perform a logical OR operation or a concatenate operation between the input vector generated by the preprocessor 241 and the input vector generated by the preprocessor 242 to generate a combined input vector for input to the detector 243.

The detector 243 may be configured to evaluate the combined data to generate a decision that is responsive to the current query 181. The detector 243 may comprise a machine learning model or other module for detecting cyberattacks. Advantageously, the detector 243 receives more data on a cyberattack, compared to previous approaches, allowing the detector 243 to detect multistage cyberattacks, such as advanced persistent threats.

In an example operation of the stateful detector 185, the query 181-1 is the current query and the observation data 250-1 included in the query 181-1 meet the selection criteria of the selectors 261 and 262. Accordingly, the selector 261 stores the observation data 250-1 in the observation database 250 (see arrow 201) and the selector 262 stores the observation data 250-1 in the cybersecurity database 224 (see arrow 202).

In the example operation, the observation data 250-2, observation data 250-3, and observation data 250-4 are stored observation data from previously-received queries 181. The attention module 231 parses the observation data 250-1 of the query 181-1 (see arrow 203) and identifies the observation data 250-2, observation data 250-3, and observation data 250-4 as being relevant to the query 181-1 (see arrows 204).

The attention module 232 assembles the relevant observation data 250-2, observation data 250-3, and observation data 250-4 into the set 260 of observation data 250 (see arrows 205). The attention module 232 identifies the observation data 250-1 as being the current observation data (see arrow 207) and accordingly adds the observation data 250-1 to the set 260 (see arrow 208). The preprocessor 241 receives (see arrow 209) and preprocesses the set 260 to generate preprocessed observation data 250, which are received by the combiner 221 (see arrow 210).

The attention module 233 parses the observation data 250-1 of the query 181-1 (see arrow 211) and identifies cybersecurity data in the cybersecurity database 224 that are relevant to the query 181-1 (see arrow 212). The preprocessor 242 receives (see arrow 213) and preprocesses the relevant cybersecurity data to generate preprocessed cybersecurity data, which are received by the combiner 221 (see arrow 214). The combiner 221 combines the preprocessed data from the preprocessors 241 and 242 to generate combined data, which are input to the detector 243 (see arrow 215). The detector 243 evaluates the combined data for cyberattacks and makes a corresponding decision (see arrow 216).

Figure 3:
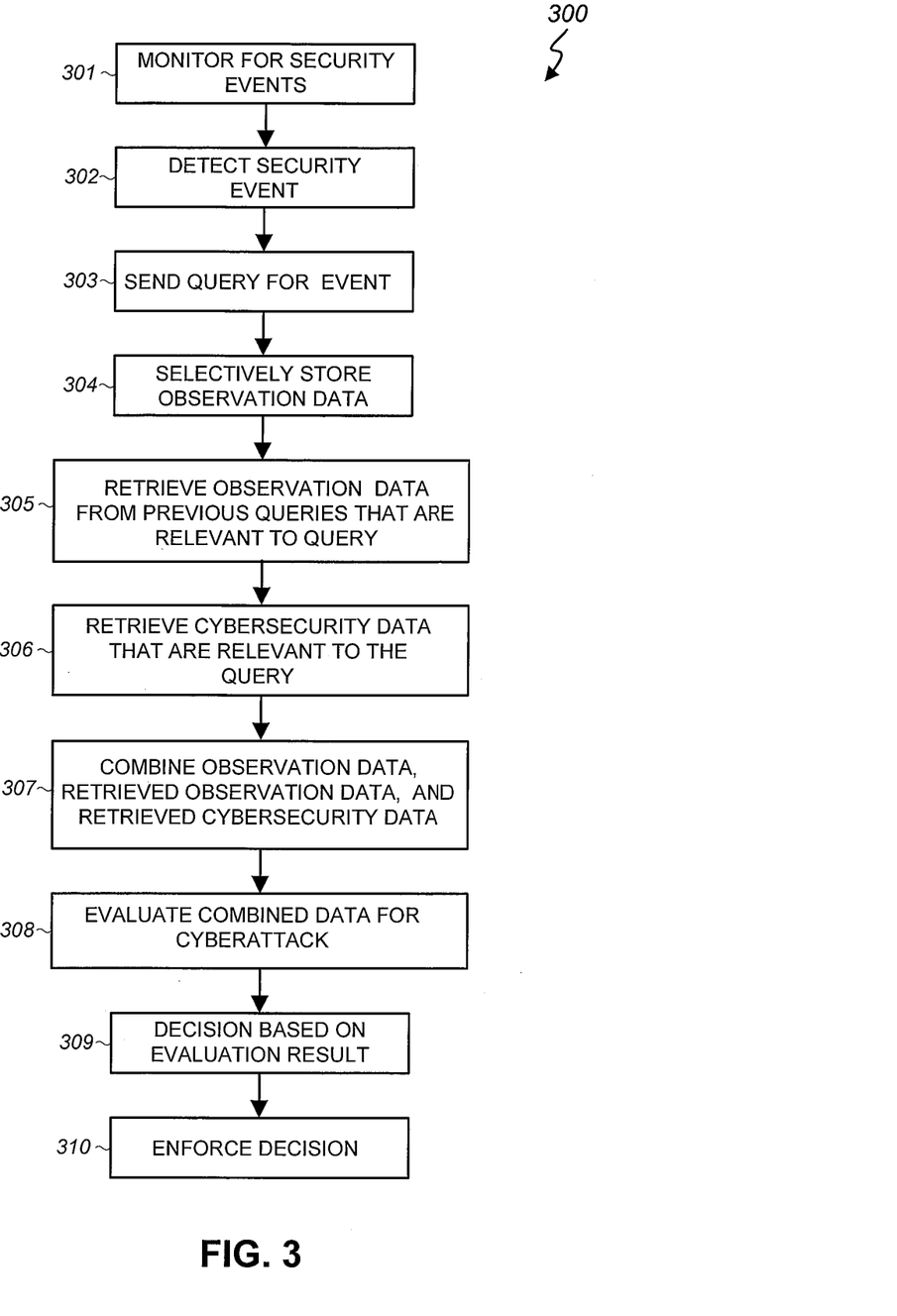
FIG. 3 shows a flow diagram of a method of detecting cyberattacks in accordance with an embodiment of the present invention.

FIG. 3 shows a flow diagram of a method 300 of detecting cyberattacks in accordance with an embodiment of the present invention. The method 300 may be performed by the backend computer system 180, as programmed with the stateful detector 185, in conjunction with one or more endpoint computers 170 that are programmed with an endpoint monitor 171. The method 300 may also be performed by other computing devices without detracting from the merits of the present invention.

In the example of FIG. 3, an endpoint monitor monitors an endpoint computer for security events (step 301). The endpoint monitor detects a security event (step 302) and, in response, sends a query (step 303) to a stateful detector that is hosted by a backend computer system. The query includes observation data of the security event. At the backend computer system, the stateful detector selectively stores the observation data in an observation database (step 304). The stateful detector identifies and retrieves, from the observation database, stored observation data that are relevant to the query (step 305). The stored observation data in the observation database are from previous queries. The stateful detector identifies and retrieves, from one or more cybersecurity databases, cybersecurity data that are relevant to the query (step 306). The stateful detector generates combined data by combining the observation data from the current query, retrieved observation data, and retrieved cybersecurity data (step 307). The stateful detector evaluates the combined data for cyberattacks (step 308) and makes a corresponding decision (step 309). The decision may be enforced by the endpoint computer or some other computing device (step 310).

Figure 4:
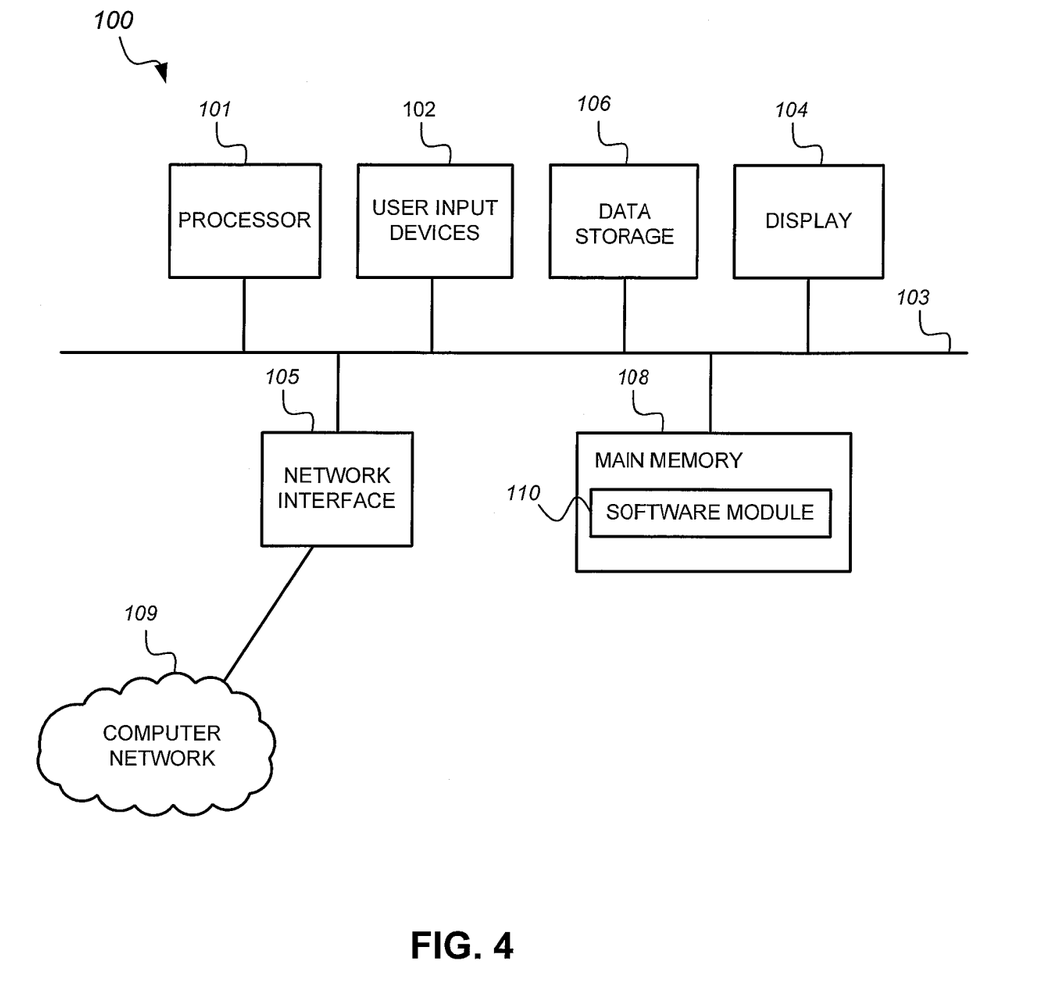
FIG. 4 shows a logical diagram of a computer system that may be employed with embodiments of the present invention.

Referring now to FIG. 4, there is shown a logical diagram of a computer system 100 that may be employed with embodiments of the present invention. The computer system 100 may be employed as a backend computer system, endpoint computer, or other computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a backend computer system, the software modules 110 may comprise a stateful detector. In another embodiment where the computer system 100 is configured as an endpoint computer, the software modules 110 may comprise an endpoint monitor.

Systems and methods for detecting cyberattacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting cyberattacks, the method comprising:
   detecting a security event;
   in response to detecting the security event, generating a query that includes observation data of the security event;
   searching a first database for other observation data that are relevant to the observation data, the other observation data being of other security events and included in previous other queries that were generated in response to detecting the other security events, the other observation data being stored in the first database;
   generating a set of observation data that comprises the observation data and the other observation data;
   searching a second database for cybersecurity data that are relevant to the observation data;
   generating a combined input vector that indicates presence of corresponding features in the set of observation data and the cybersecurity data; and
   inputting the combined input vector into a detector to generate a decision that is responsive to the query, the decision being based on evaluation of the combined input vector by the detector to determine whether the security event is a cyberattack.

2. The method of claim 1, wherein the security event is detected at an endpoint computer that sent out the query, the previous other queries were sent out by the endpoint computer before the query, and the previous other queries are responsive to detection of the other security events by the endpoint computer before the security event.

3. The method of claim 1, further comprising:
   normalizing the set of observation data into a first vector;
   normalizing the cybersecurity data into a second vector; and
   performing a logical operation on the first and second vectors to generate to generate the combined input vector.

4. The method of claim 1, further comprising:
   enforcing the decision by putting an object in quarantine.

5. The method of claim 4, wherein the security event is detected at an endpoint computer and the decision is made by a backend computer system that received the query from the endpoint computer.

6. The method of claim 1, further comprising:
   storing the observation data in the first and second databases.

7. The method of claim 1, wherein the observation data comprise a first executable file, the other observation data comprise a second executable file, and the second executable file is identified as relevant to the first executable file based on similarity of the second executable file to the first executable file.

8. The method of claim 1, wherein the observation data comprise an object that is identified to be associated with a threat actor and the other observation data comprise data associated with the threat actor.

9. The method of claim 8, wherein the threat actor is a particular malware and the other observation data comprise data associated with the particular malware.

10. A system for detecting cyberattacks, the system comprising:
an endpoint computer that is configured to monitor for security events and send out a query in response to detecting a security event, the query including observation data pertaining to the security event; and
a backend computer system that is configured to receive the query over a computer network, store other observation data included in other queries previously received by the backend computer system from the endpoint computer, retrieve the other observation data in response to determining that the other observation data are relevant to the query, retrieve cybersecurity data that are relevant to the query, generate a combined input vector, input the combined input vector into a detector to generate a decision that is responsive to the query and is based on evaluation of the combined input vector to determine whether the security event is a cyberattack on the endpoint computer, and provide the decision to the endpoint computer,
wherein the other observation data pertain to other security events and are included in the other queries, the other queries were sent out by the endpoint computer in response to detecting the other security events in the endpoint computer, and
the combined input vector indicate presence of corresponding features in the observation data, the other observation data, and the cybersecurity data.

11. The system of claim 10, wherein the observation data comprise an executable file and the decision indicates putting the executable file in quarantine.

12. The system of claim 10, wherein the decision is enforced by the endpoint computer.

13. The system of claim 10, wherein the backend computer system is configured to retrieve the cybersecurity data from a cybersecurity database that is external to the backend computer system.

14. The system of claim 13, wherein the backend computer system is configured to store the observation data in the cybersecurity database.

15. A method of detecting cyberattacks, the method comprising:
detecting a security event;
in response to detecting the security event, generating a query that includes observation data of the security event;
searching a first database for other observation data that are relevant to the observation data, the other observation data being of other security events and included in previous other queries that were generated in response to detecting the other security events;
generating a combined input vector that indicates presence of corresponding features in the observation data and the other observation data; and
inputting the combined input vector into a detector to generate a decision that is responsive to the query, the decision being based on evaluation of the combined input vector by the detector to determine whether the security event is a cyberattack.

16. The method of claim 15, further comprising:
normalizing the set of observation data to generate a first vector;
searching a second database for particular cybersecurity data that are relevant to the observation data, the second database storing cybersecurity data received from a plurality of data sources;
normalizing the particular cybersecurity data to generate a second vector; and
performing a logical operation on the first and second vectors to generate the combined input vector.

17. The method of claim 16, further comprising:
storing the observation data in the first and second databases.

18. The method of claim 16, further comprising:
enforcing the decision by putting an object in quarantine.

19. The method of claim 18, wherein the security event is detected at an endpoint computer and the decision is made by a backend computer system that received the query from the endpoint computer.

20. The method of claim 18, wherein the decision is enforced at the endpoint computer.

* * * * *